May 19, 1970   KOICHI SUGIURA   3,512,833
ADJUSTABLE HEAD REST FOR VEHICLE SEATS
Filed Aug. 5, 1968

INVENTOR.
KOICHI SUGIURA

BY
Harry G. Shapiro
ATTORNEY

United States Patent Office 3,512,833
Patented May 19, 1970

3,512,833
ADJUSTABLE HEAD REST FOR VEHICLE SEATS
Koichi Sugiura, Toyota-shi, Japan, assignor to Toyota Jidosha Kogyo Kabushiki Kaisha, Toyota-shi, Aichi-ken, Japan, a corporation of Japan
Filed Aug. 5, 1968, Ser. No. 750,096
Claims priority, application Japan, Aug. 11, 1967, 42/69,232
Int. Cl. A47c 7/38
U.S. Cl. 297—410
7 Claims

ABSTRACT OF THE DISCLOSURE

An adjustable head rest for a vehicle seat which employs a plate member secured to the fixed frame for the back rest of the seat. The plate member has guide means associated therewith. A connecting member depending from the head rest and secured thereto is guided for up and down movement. The connecting member is provided with a plurality of vertically spaced, substantially V-shaped recesses. A wire spring member is positioned adjacent the head rest connecting member with its ends secured to the plate member by vertically spaced means provided by the plate member. The wire spring member has an intermediate portion formed to provide a detent projection of substantially V-shape. The detent projection is receivable in the vertically spaced, substantially V-shaped recesses, whereby the head rest may be adjusted to desired position with respect to the fixed seat frame.

BACKGROUND OF THE INVENTION

In conventional adjustable head rests for vehicle seats, the vertically extending standard or member for connecting the head rest to the back rest of the seat is provided with means cooperable with the free end of a spring plate or leaf spring, the opposite end of which is fixed to a support. This one ended plate spring means for providing adjustability of the head rest has a number of limitations. It furnishes an undue amount of play and a rocking effect causing discomfort or an unpleasant feeling to the passenger. Also, the spring action furnished by a plate or leaf spring is less than satisfactory for adjusting the position of a head rest.

SUMMARY OF THE INVENTION

In accordance with the invention, a head rest for a vehicle seat is adjustably mounted to overcome the above described inadequacies and disadvantages of known devices for adjusting the position of head rests. A rigid plate member is secured to the fixed frame provided for the vehicle seat or its back rest. The plate member extends horizontally and has a main portion thereof lying in a vertical plane. The head rest has a connecting member secured thereto which extends downwardly therefrom and is vertically adjustable with respect to the fixed plate member, also the frame to which the plate member is secured. To confine and guide the head rest connecting member for movement in a vertical plane, the plate member has guide means connected or associated therewith. The head rest connecting member is made of metal rod or bar stock, and may be of the usual type such as an inverted, substantially U-shaped member, the vertical arms of which are extended through a pair of laterally spaced guide means connected to the plate member. The head rest connecting member is provided with a plurality of vertically spaced, substantially V-shaped recesses.

A wire spring member is positioned adjacent the head rest connecting member. The ends of the wire spring member are in fixed relation to the plate member, the wire ends preferably being connected to the plate member by vertically spaced means provided by the plate member. The wire spring is bent to furnish an intermediate portion substantially mid-way of its ends, the intermediate portion lying in a substantially horizontal plane. The intermediate portion of the wire spring is further bent to provide a detent projection which is substantially V-shaped or triangular for cooperation with the vertically spaced, substantially V-shaped recesses in the head rest connecting member. The wire spring member is positioned to bias the detent projection into a substantially V-shaped recess when opposite a recess to resiliently maintain the head rest in selected position.

Upon applying a force to the head rest to raise or lower it, the head rest connecting member is disengaged from the detent projection until a recessed area of the connecting member is aligned with the detent projection, whereupon the detent projection forcefully enters the adjacent recess to resiliently maintain the connecting member and its associated head rest in such adjusted position.

Due to the configuration of the wire spring member, its manner of mounting, and the relationship of the wire spring member to the cooperable spaced recesses provided by the head rest connecting member, improved support and adjustability of the head rest are achieved.

The improved adjustable head rest of the invention is suitable for use in connection with seats in any of the normal or conventional vehicles such as airplanes, automobiles, railway cars, etc.

An object of the invention is to provide a head rest for a vehicle seat mounted for adjustability of the head rest in a vertical plane wherein improved means is provided for adjusting the position of the head rest with respect to the back of the seat.

Another object of the invention is to provide an improved head rest mounted for adjustment to suit the needs of the individual passenger, wherein the means for adjusting the position of the head rest does not impart undue movement to the head rest to the discomfort of the passenger.

A further object of the invention is to provide means for adjusting the position of the head rest which is compact, simple in construction, easy to operate and economical to manufacture.

These, and other objects and advantages of the invention will be apparent from the following illustration and detailed description of a preferred embodiment of the invention.

DESCRIPTION OF THE PREFERRED EMBODIMENT

Figure 1:
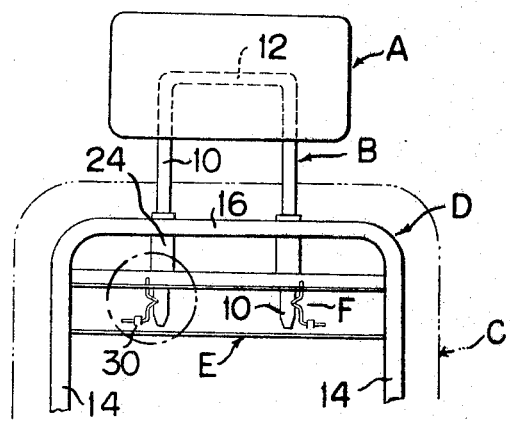
FIG. 1 is a front view of an adjustable head rest made in accordance with the invention provided on the back rest of a seat, the frame of the back rest being partially shown and the remainder of the back rest being shown in phantom.

In greater detail and referring to FIG. 1, a head rest

A is connected by suitable means B to the back rest C of a vehicle seat including a fixed frame D. One form of conventional connecting means comprises a metal rod bent to substantially U-shape and inverted so that there are a pair of laterally spaced arms 10 with an intermediate horizontally extending portion 12. This latter portion is secured to support means (not shown) associated with the head rest A is by, for example, welding. The head rest may be of usual or known construction comprising padding or resilient material covered by leather or a leather-like material.

The frame D may be of a usual or known construction and, as illustrated, may comprise a metal rod bent to substantially U-shape and inverted so that there is a pair of laterally spaced arms 14 with an intermediate horizontally extending portion 16. As shown, the frame D, though of the same configuration and orientation as the connecting member B, is of larger dimensions in the respect that the arms thereof are spaced apart a greater distance than the arms of the connecting member, and consequently the intermediate horizontally extending portion is longer. The frame D is supported in a fixed position within the back rest C.

Figure 2:
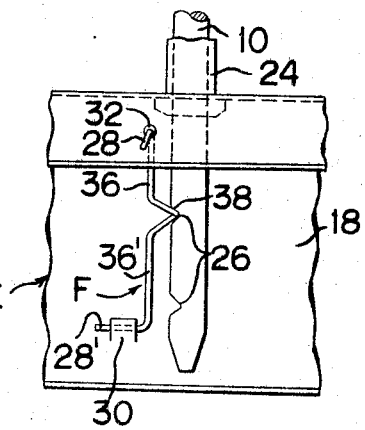
FIG. 2 is an enlarged view showing the portion of the structure within the circle of FIG. 1.
Figure 3:
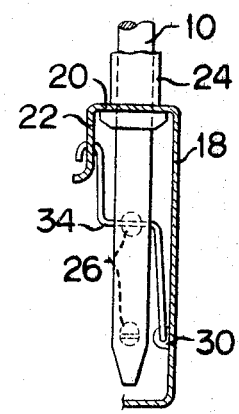
FIG. 3 is a side elevational view of the structure shown in FIG. 2.
Figure 4:
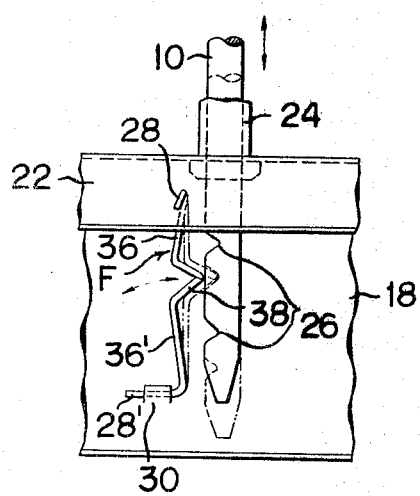
FIG. 4 is a view similar to FIG. 2 showing the manner of operation and the relationship of the parts when the head rest is moved in a vertical plane to adjust its position with respect to the seat frame.

A plate member E is connected to the frame D and extends horizontally between the arms 14. The plate member is secured to the rear side of the frame by any suitable means such as by welding. As shown in FIGS. 2, 3 and 4, the plate member E comprises a main portion 18 lying in a vertical plane, a forwardly extending top portion 20 lying in a horizontal plane, and a downturned extension 22 of the top portion lying in a vertical plane substantially parallel to the plane of the main portion 18. The top portion 20 is provided with laterally spaced openings spaced apart a distance equal to the distance between the laterally spaced arms 10 of the head rest connecting member B. Guide means in the form of a tubular bearing member 24 is associated with each of the openings, and the arms 10 of the head rest connecting member are respectively extended therethrough. Preferably, the bearing guides are welded to the top portion 20 and, as shown in FIG. 1, they extend upwardly from the plate member to adjoin the crossbar 16 of the frame D.

Each of the arms 10 of the connecting member B is provided with a plurality of vertically spaced substantially V-shaped recesses 26, the recesses in each arm being in alignment in a vertical plane, and the recesses on the respective arms being in alignment in a horizontal plane. As viewed in FIG. 1, the recesses in the arms 10 face toward the side of each arm with the recesses in the respective arms facing in opposite directions.

A wire spring member F is associated with each of the arms 10, and is formed for cooperation with the vertically spaced recesses 26 in each arm. The wire spring member has its ends 28, 28' connected to the plate member E. Preferably, and as illustrated, the main portion 18 of the plate member is provided with an eye 30 which is formed by striking out a portion of the plate member near the lower end of the main portion 18, and bending such struck portion to furnish an opening through which the end 28' of the wire spring member may be extended and held. The upper end 28 of the wire spring member is extended through an opening 32 in the downturned extension 22. The wire spring member is held at its upper end by bending the wire to provide a hook.

As shown in FIG. 3, the wire spring member F is bent midway of its ends to provide an intermediate portion 34 which lies in a substantially horizontal plane as distinguished from the portions 36, 36' of the wire spring which extend in a generally vertical direction. The intermediate portion 34 is further bent to provide a detent projection 38. This projection is triangular or substantially V-shaped for cooperation with the substantially V-shaped recesses 26.

Each wire spring member F is secured at its vertically spaced ends to the plate member E, and it is related to its adjacent respective arm 10 of the head rest connecting member B so that the detent projection 38 is urged against the arm and will be forcefully received within a recess 26 in the arm when aligned therewith. FIG. 4 illustrates the action of the wire spring member when a force is imparted to the head rest and its connecting member in a vertical plane, as indicated by the arrows. Upon grasping the head rest to move it up or down, the projecting detent 38 of each spring member rides on the outer surface of the adjacent arm 10, which is guided for movement with very little play by the guide bearings 24. The detent 38, when aligned with a recess 26, snaps into the recess to hold the head rest in selected position. The detent is cammed out of the recess when a force in a vertical plane is manually applied to the head rest. The vertically extending portions 36, 36' of the wire spring members are flexed outwardly about their fixed ends 28, 28'.

When the detent is cammed out of the recess, the detent 38 contacts with the circular surface of the arm 10, so that only substantially a point contact friction is produced between the detent and the arm, which enables very smooth up-and-down operation of the arm. When the detent is snapped into the recess, a frictional force is produced between the detent and the line contact area of the recess, and in addition to this, the recess receives the reactional force in the direction substantially perpendicular to the axis of the arm of the tension, compression, bending and torsion of the spring member F so that the vertically upper and lower directional components of these frictional force and reactional force will perfectly lock the up-and-down movement of the arm.

Figure 5:
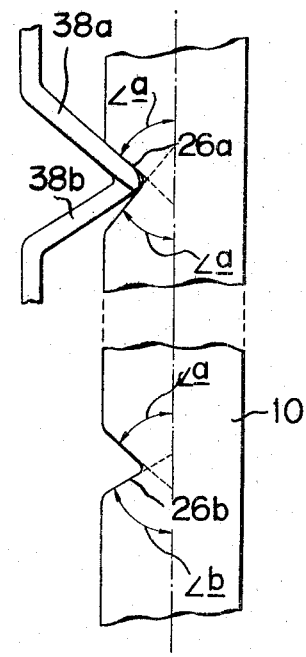
FIG. 5 is a partial enlarged view showing the position of the wire spring member with respect to the head rest connecting member in a lowered position of the head rest, this view also showing the relationship of parts in the uppermost position of the head rest.

As shown in FIG. 4 and best seen from FIG. 5, the recesses 26 in each arm have the same shape except the lowermost one. For distinguishing this clearly, in FIG. 5, the lowermost recess is designated as 26b while other recesses, only one of which being shown, are designated as 26a. In each recess 26a it is preferable that the top side and bottom side thereof subtend substantially the same angle $a$ to the axis of the arm 10 for enabling smooth movement of the detent in both upward and downward directions. However, in recess 26b, the top side thereof subtends substantially the same angle $a$ to the axis of the arm 10, however, the bottom side thereof subtends preferably a different angle $b$ which is larger than the angle $a$ to the axis of the arm 10. This relationship furnishes a stop acting to prevent the arms 10 from being pulled out beyond the desired uppermost position of the head rest.

As mentioned above, the spring member engageable with the V-shaped recess in the arm is preferably made of wire material and has the shape described in the foregoing, it is very easy to produce the same and to adapt it for the purpose as compact as possible with a great locking effect and smooth operability.

It is believed that the advantages and improved results furnished by the adjustable head rest of the invention will be apparent from the foregoing detailed description of a preferred embodiment thereof. Various changes and modifications may be made without departing from the spirit and scope of the invention as sought to be defined in the following claims.

What is claimed is:

1. An adjustable head rest for a vehicle seat comprising a fixed frame, a plate member secured to the frame, guide means associated with the plate member, a vertical head rest connecting member extended through the guide means, a plurality of vertically spaced, substantially V-shaped recesses in the head rest connecting member, a wire spring member adjacent the head rest connecting member having its ends in fixed relation with respect to the plate member, the wire spring member having an intermediate portion substantially midway of its ends lying in a substantially horizontal plane and a detent projecting from the intermediate portion, the detent being substantially V-shaped for cooperation with the substantially V-shaped recesses.

2. An adjustable head rest as set forth in claim 1, wherein the head rest connecting member comprises an inverted substantially U-shaped member having a horizontally extending portion and a pair of laterally spaced, vertically extending arms, a plurality of vertically spaced, substantially V-shaped recesses being provided in each of the arms; and wherein the guide means comprise a pair of laterally spaced tubular bearing members secured to the plate member, the head rest connecting member arms being extended through said bearing members.

3. An adjustable head rest as set forth in claim 1, wherein the plate member has a main portion lying in a vertical plane, a top portion extending forwardly thereof lying in a horizontal plane and a downturned extension of the top portion lying in a vertical plane substantially parallel to the plane of the main portion; and wherein means is provided by the main portion near its lower end and by the downturned extension for connecting the ends of the wire spring member thereto.

4. An adjustable head rest as set forth in claim 1, wherein the frame comprises an inverted substantially U-shaped member having a horizontally extending portion and a pair of laterally spaced vertically extending arms, the plate member extending horizontally between the arms.

5. An adjustable head rest as set forth in claim 1, wherein the angles subtended by top and bottom sides of each substantially V-shaped recess to the axis of the arm is substantially equal.

6. An adjustable head rest as set forth in claim 5, wherein for the lowermost recess of the plurality of vertically spaced recesses the bottom side of the recess is at an angle larger than the angle of the top side of the recess, which is equal to the angle of the other recesses.

7. An adjustable head rest for a vehicle seat comprising a fixed frame, a horizontally extending plate member connected to the frame, the plate member having a main portion lying in a vertical plane, a top portion lying in a horizontal plane and a downturned extension of the top portion lying in a vertical plane substantially parallel to the plane of the main portion, laterally spaced openings in said top portion, a tubular bearing member associated with each of the openings, a head rest connecting member comprising a horizontally extending portion for connection to the head rest and a pair of laterally spaced, vertical arms extended through the bearing members, a plurality of vertically spaced, substantially V-shaped recesses formed in each arm, a wire spring member adjacent each arm, means provided by said main portion near its lower end and said downturned extension for connecting the ends of each wire spring member thereto, each wire spring member having an intermediate portion substantially midway of its ends lying in a substantially horizontal plane, and a detent projecting from said intermediate portion, said detent being substantially V-shaped recesses, the angle subtended by each substantially V-shaped recess being greater than the angle subtended by the substantially V-shaped detent, the top side of the detent being at an angle, coincident with the top side of the recess.

References Cited

UNITED STATES PATENTS

| 1,196,413 | 8/1916 | Yohe | 297—410 |
| 1,745,845 | 2/1930 | Ebbecke | 248—408 X |
| 2,613,731 | 10/1952 | Roginski | 297—410 X |
| 3,027,194 | 3/1962 | Rumptz | 297—410 |
| 3,145,965 | 8/1964 | Stein | 248—408 |

NILE C. BYERS, Jr., Primary Examiner

U.S. Cl. X.R.

248—408